(12) United States Patent
Gysling

(10) Patent No.: US 7,963,177 B2
(45) Date of Patent: *Jun. 21, 2011

(54) APPARATUS FOR ATTENUATING ULTRASONIC WAVES PROPAGATING WITHIN A PIPE WALL

(75) Inventor: Daniel L. Gysling, Glastonbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 77 days.

This patent is subject to a terminal disclaimer.

(21) Appl. No.: 12/422,023

(22) Filed: Apr. 10, 2009

(65) Prior Publication Data

US 2010/0257941 A1     Oct. 14, 2010

Related U.S. Application Data

(60) Provisional application No. 61/043,905, filed on Apr. 10, 2008.

(51) Int. Cl.
   *G01F 1/66*     (2006.01)
(52) U.S. Cl. ..................................... 73/861.28
(58) Field of Classification Search .......... None
   See application file for complete search history.

(56) References Cited

U.S. PATENT DOCUMENTS

| | | |
|---|---|---|
| 4,556,813 A | 12/1985 | Baumoel |
| 4,598,593 A | 7/1986 | Sheen et al. |
| 4,735,097 A | 4/1988 | Lynnworth |
| 4,838,127 A | 6/1989 | Herremans et al. |
| 5,131,279 A | 7/1992 | Lang et al. |
| 5,594,180 A | 1/1997 | Carpenter et al. |
| 6,443,226 B1 | 9/2002 | Diener et al. |
| 6,481,288 B1 | 11/2002 | Humphrey et al. |
| 6,526,838 B1 | 3/2003 | Froelich et al. |
| 6,550,342 B2 | 4/2003 | Croteau et al. |
| 6,550,345 B1 | 4/2003 | Letton |
| 6,575,043 B1 | 6/2003 | Huang et al. |
| 6,626,049 B1 | 9/2003 | Ao |
| 6,634,239 B2 | 10/2003 | Gomm et al. |
| 6,868,737 B2 | 3/2005 | Croteau et al. |
| 7,096,719 B2 | 8/2006 | Gysling |
| 7,261,002 B1 | 8/2007 | Gysling et al. |
| 7,322,245 B2 | 1/2008 | Gysling et al. |
| 7,322,251 B2 | 1/2008 | Gysling et al. |
| 7,331,233 B2 | 2/2008 | Scott |

(Continued)

FOREIGN PATENT DOCUMENTS

DE     4306119     9/1994

(Continued)

*Primary Examiner* — Harshad Patel
(74) *Attorney, Agent, or Firm* — O'Shea Getz P.C.

(57) ABSTRACT

A damping device for a fluid flow meter mountable on the exterior of a pipe to meter fluid flow traveling within the pipe is provided. The flow meter has at least one ultrasonic sensor operable to transmit ultrasonic signals through a pipe wall in a direction normal to the pipe wall and into a fluid flow disposed within the pipe, which signals create secondary ultrasonic signals circumferentially traveling within the pipe wall at a frequency. The damping device includes a base and a plurality of tines. The base is conformable to an exterior surface of the pipe wall, and has a pipe-side surface and a tine-side surface. The plurality of tines is attached to the base and extends outwardly from the tine-side surface. Each tine is spaced apart from an adjacent tine by a tine-to-tine distance that is less than the wavelength of the secondary ultrasonic signals circumferentially propagating within the pipe wall.

16 Claims, 8 Drawing Sheets

U.S. PATENT DOCUMENTS

| | | |
|---|---|---|
| 7,389,187 B2 | 6/2008 | Kersey et al. |
| 7,430,924 B2 | 10/2008 | Gysling et al. |
| 7,437,946 B2 | 10/2008 | Gysling |
| 7,526,966 B2 | 5/2009 | Gysling et al. |
| 7,624,650 B2 * | 12/2009 | Gysling et al. ............. 73/861.27 |
| 7,624,651 B2 * | 12/2009 | Fernald et al. ............. 73/861.27 |
| 2006/0259260 A1 | 11/2006 | Frohlich et al. |
| 2008/0098818 A1 | 5/2008 | Fernald et al. |
| 2008/0098824 A1 | 5/2008 | Bailey et al. |
| 2008/0173100 A1 | 7/2008 | Davis |
| 2009/0025487 A1 | 1/2009 | Gysling et al. |
| 2009/0158858 A1 | 6/2009 | Gysling et al. |
| 2009/0229364 A1 | 9/2009 | Gysling |
| 2010/0000331 A1 * | 1/2010 | Gysling ..................... 73/861.28 |

FOREIGN PATENT DOCUMENTS

| | | |
|---|---|---|
| GB | 2210169 | 6/1989 |
| WO | 9314382 | 7/1993 |

* cited by examiner

APPARATUS FOR ATTENUATING ULTRASONIC WAVES PROPAGATING WITHIN A PIPE WALL

This application claims the benefit of U.S. Provisional Patent Application Ser. No. 61/043,905, filed Apr. 10, 2008.

BACKGROUND OF THE INVENTION

1. Technical Field

This invention relates to a method and apparatus for attenuating acoustic waves (or ring around acoustics) propagating through the walls of a pipe for a clamp-on ultrasonic flow meter.

2. Background Information

Clamp-on ultrasonic flow meters are a desirable tool for determining characteristics of a fluid flow traveling through a pipe. The flow meters typically include a plurality of ultrasonic sensors, each having a transmitter and a receiver. In some sensor configurations, ultrasonic signals emitted from the transmitters travel through the immediate pipe wall, the fluid flow disposed within the pipe, and through the opposite pipe wall where they are sensed by the receiver portion. In other sensor configurations, the transmitters and receivers are disposed on the same side of the pipe; the sensed fluid flow signal component is one that has reflected off of the opposite pipe wall and traversed the fluid flow a second time. Regardless of the sensor configuration, the received signal is processed to determine information such as flow velocity, volumetric flow rate, water cut, etc.

One of the primary challenges associated with clamp-on ultrasonic flow metering is distinguishing the fluid borne signal component from a structural borne component that is generated when the ultrasonic signal travels through the pipe on a path substantially normal to the surface of the pipe. The fluid borne component contains useful information relating to characteristics of the fluid flow. The structural signal component, on the other hand, does not travel through the fluid flow, and therefore does not contain useful information relative to the fluid flow. In fact, the structural borne signal is predominantly a shear wave that travels within the pipe, and can "ring-around" the pipe circumference several times before dissipating. Collectively, the structural borne "ring-around" signals create interference that makes it difficult to extract the desired fluid borne signal component. Hence, there is considerable value in minimizing or eliminating structural borne signal components.

SUMMARY OF THE INVENTION

According to one aspect of the present invention, a damping device for a fluid flow meter mountable on the exterior of a pipe to meter fluid flow traveling within the pipe is provided. The flow meter has at least one ultrasonic sensor operable to transmit ultrasonic signals through a pipe wall in a direction normal to the pipe wall and into a fluid flow disposed within the pipe, which signals create secondary ultrasonic signals circumferentially traveling within the pipe wall at a frequency. The damping device includes a base and a plurality of tines. The base is conformable to an exterior surface of the pipe wall, and has a pipe-side surface and a tine-side surface. The plurality of tines is attached to the base and extends outwardly from the tine-side surface. Each tine is spaced apart from an adjacent tine by a tine-to-tine distance that is less than the wavelength of the secondary ultrasonic signals circumferentially propagating within the pipe wall.

According to another aspect of the present invention, a damping device for a fluid flow meter mountable on the exterior of a pipe to meter fluid flow traveling within the pipe is provided. The flow meter has at least one ultrasonic sensor operable to transmit ultrasonic signals through a pipe wall in a direction normal to the pipe wall and into a fluid flow disposed within the pipe, which signals create secondary ultrasonic signals circumferentially traveling within the pipe wall at a frequency. The damping device includes a laminate damping panel having alternating layers of tines and viscoelastic material bonded to one another. Each tine is spaced apart from an adjacent tine by a tine-to-tine distance that is less than the wavelength of the secondary ultrasonic signals circumferentially propagating within the pipe wall.

According to another aspect of the present invention, a fluid flow meter apparatus operable to be attached to the exterior of a pipe and to meter fluid flow traveling within the pipe is provided. The apparatus includes a metering device and at least one damping device. The metering device has a plurality of ultrasonic sensors operable to be mounted on an exterior surface of the pipe and to transmit ultrasonic signals orthogonally through a wall of the pipe and into the fluid flow traveling within the pipe. The transmitted signals create secondary ultrasonic signals circumferentially traveling within the pipe wall at a frequency. The damping device is operable to be attached to the exterior surface of the pipe, and has a plurality of tines. Each tine is spaced apart from an adjacent tine by a tine-to-tine distance that is less than the wavelength of the secondary ultrasonic signals circumferentially propagating within the pipe wall.

The present apparatus and advantages associated therewith will become more readily apparent in view of the detailed description provided below, including the accompanying drawings.

DETAILED DESCRIPTION OF THE INVENTION

Figure 1:
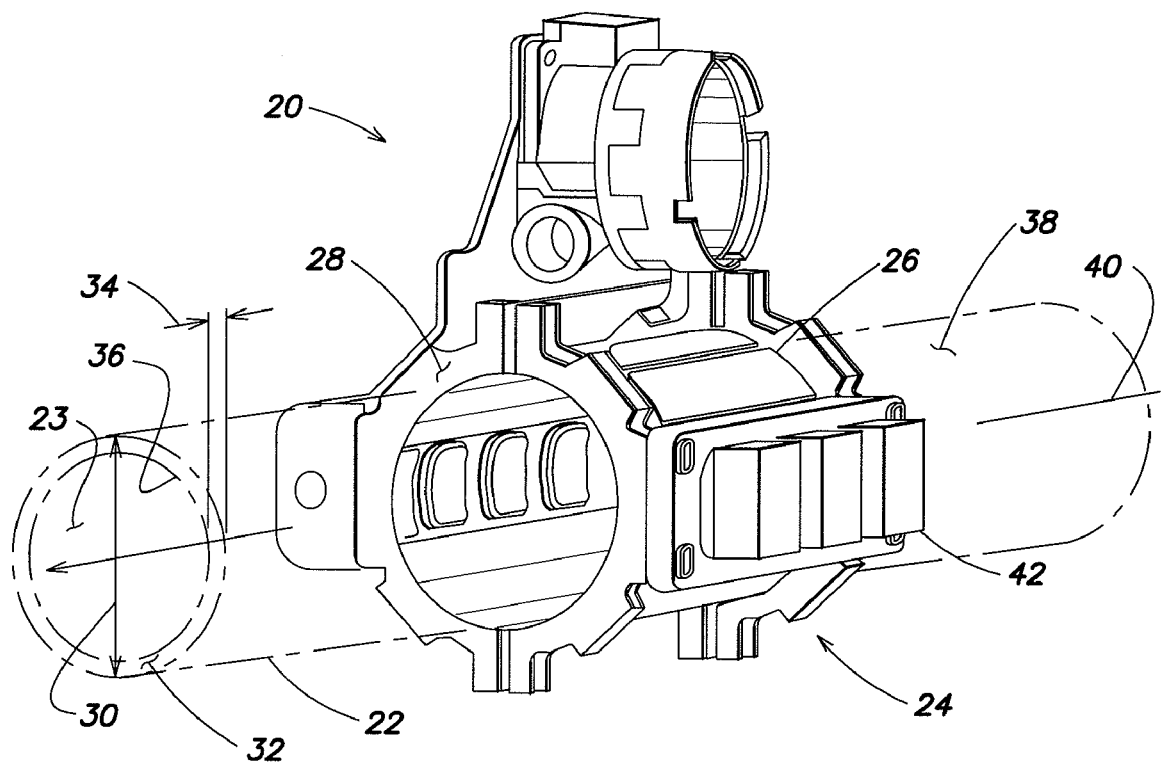
FIG. 1 is a diagrammatic view of a fluid flow meter system including a fluid flow metering device and damping devices mounted on a pipe shown in phantom.
Figure 2:
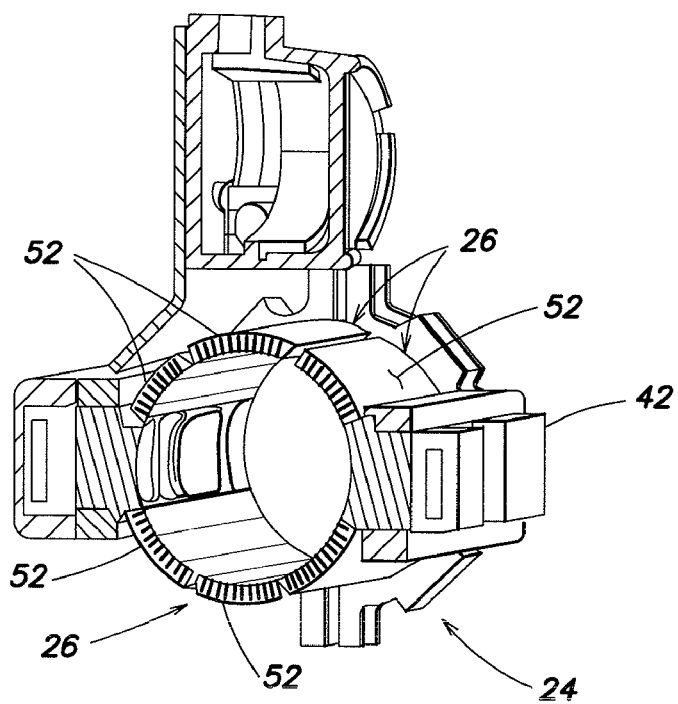
FIG. 2 is a diagrammatic sectional view of a fluid flow meter system shown in FIG. 1.

Referring to FIGS. 1 and 2, an ultrasonic flow meter system 20 is provided operable to be attached to the exterior of a pipe 22 (shown in phantom) containing a fluid flow 23, which system 20 is sometimes referred to as a "clamp-on" type system. The system 20 includes an ultrasonic flow meter 24, a damping device 26, and mounting hardware 28. The pipe 22 has a diameter 30, a pipe wall 32 with wall thickness 34, an interior surface 36 an exterior surface 38, and an axial centerline 40.

Figure 3:
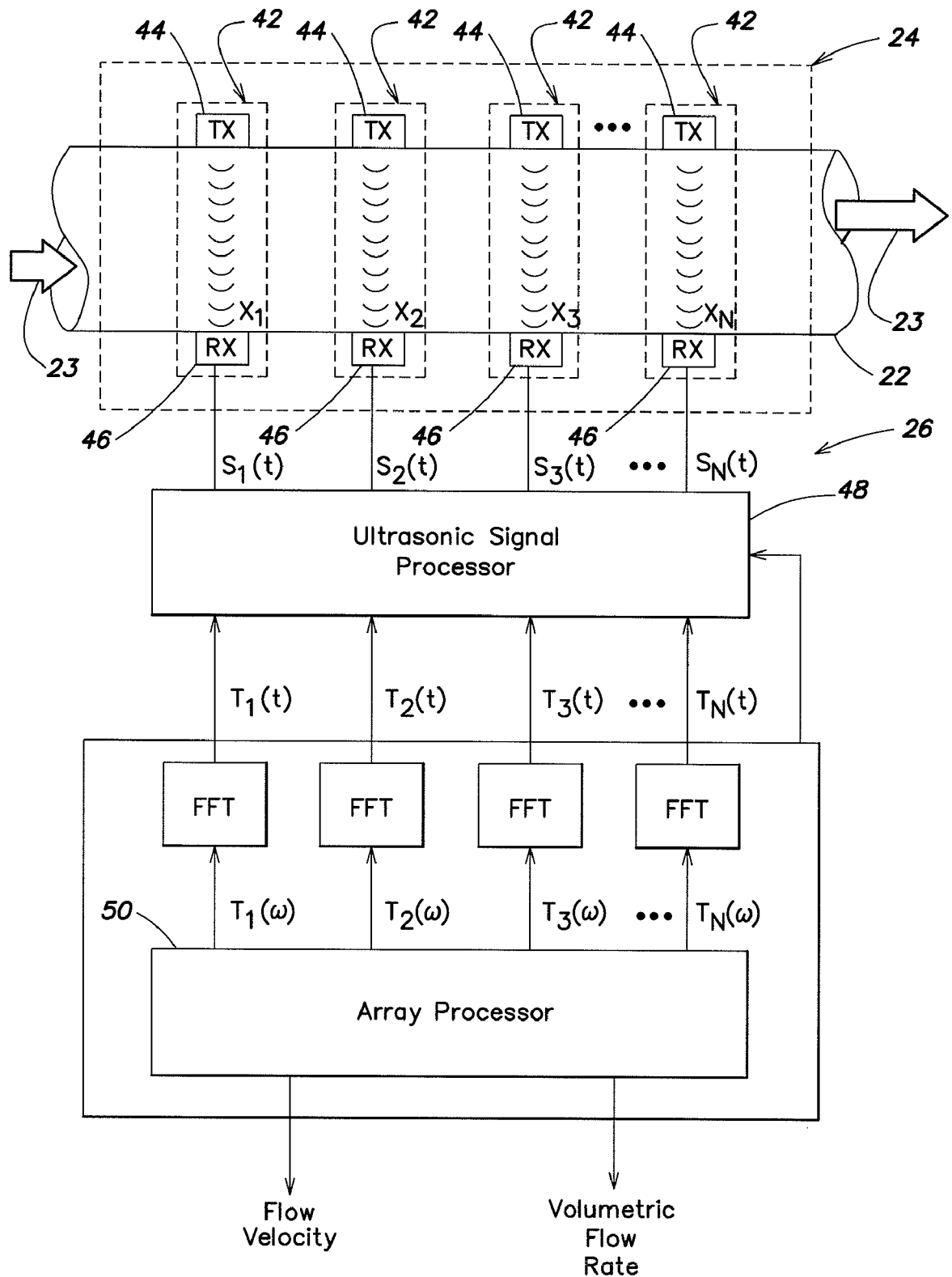
FIG. 3 is a diagrammatic representation of a clamp-on fluid flow meter that can be used with the present damping device.
Figure 4:
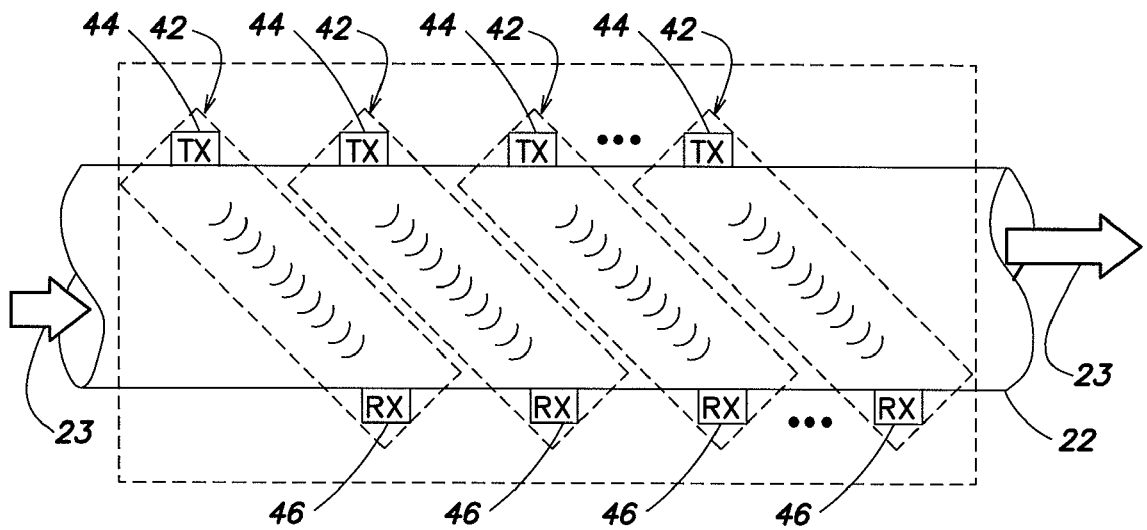
FIGS. 4-7 diagrammatically illustrate ultrasonic sensor arrangements that can be used in fluid flow meters with which the present damping device can be used.
Figure 5:
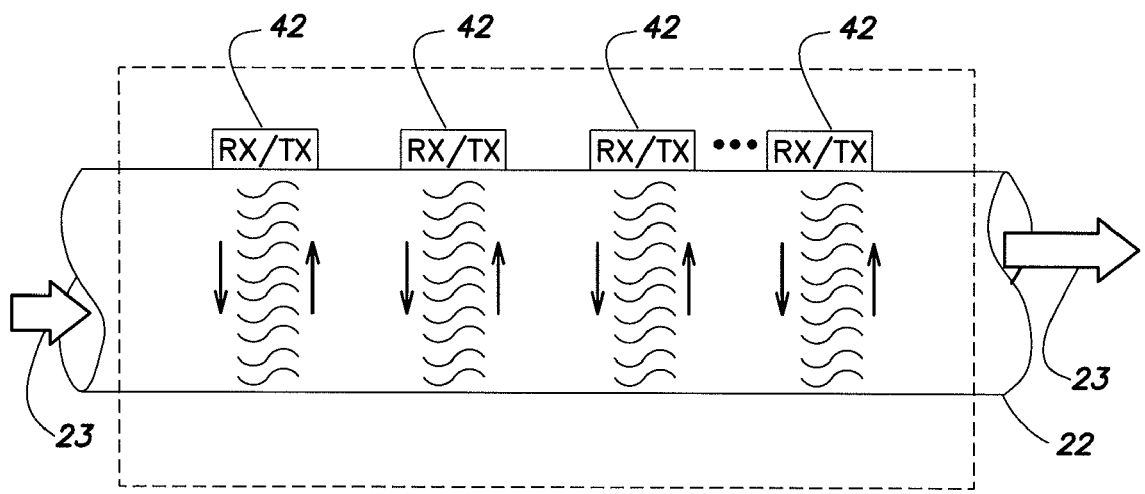
Figure 6:
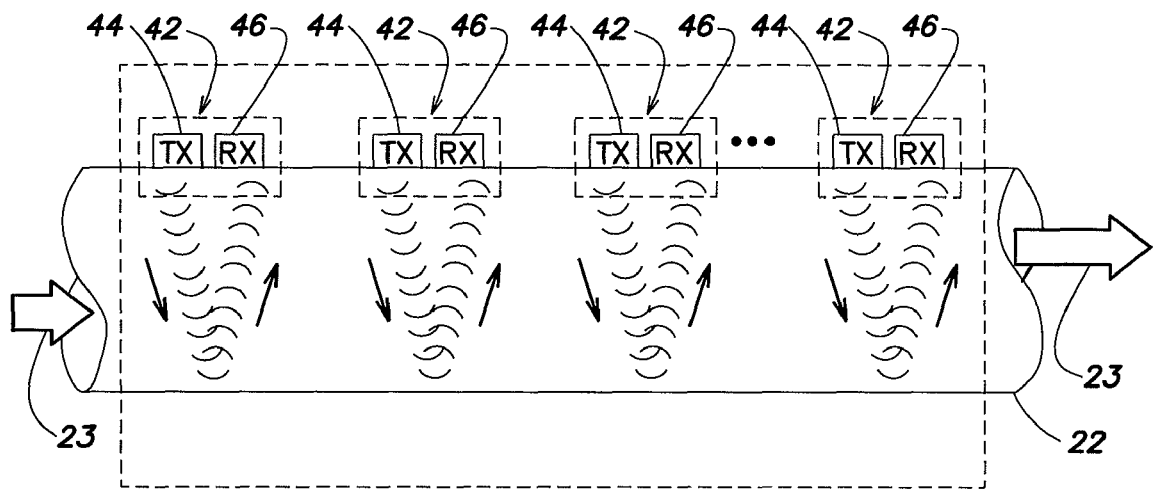
Figure 7:
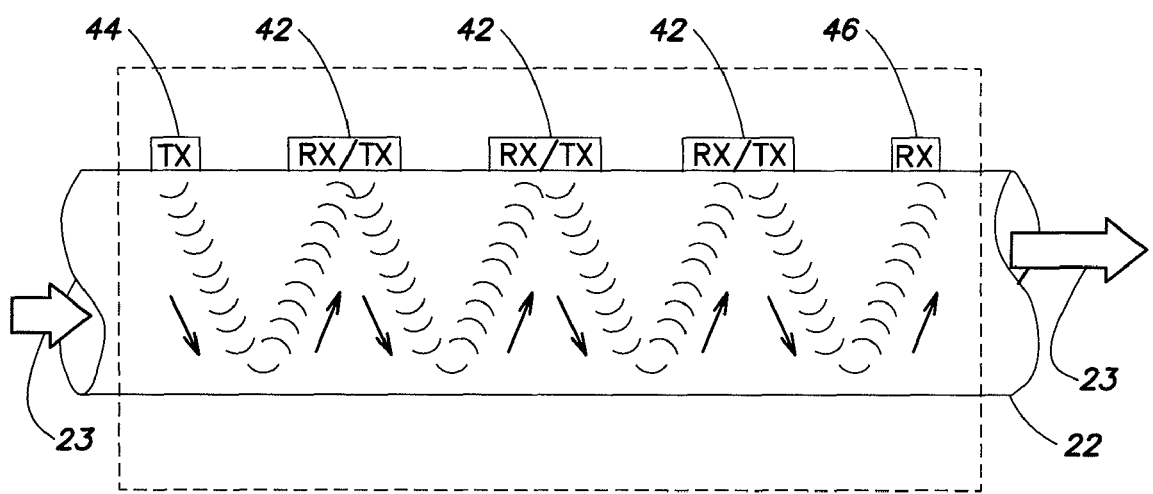

The present invention damping device 26 can be used with a variety of ultrasonic flow meters 24. The ultrasonic flow meter described in U.S. Pat. No. 7,389,187, which is hereby incorporated by reference in its entirety, is an example of such a device. As can be digrammatically seen in FIG. 3, the flow meter 24 includes an array of ultrasonic sensors 42 disposed axially along the length of a pipe 22. Each ultrasonic sensor 42 comprises a transmitter 44 (TX) and a receiver 46 (RX) pair. The transmitter 44 provides an ultrasonic signal across the pipe 22 in a direction that is orthogonal to the direction of the fluid flow 23 where it is received by the corresponding receiver 46. The present invention is not limited to use with sensors 42 having orthogonally opposed transmitter-receiver pairs, however, and can be used with alternative sensor 42 configurations such as pitch and catch configurations, pulse echo configurations, and combined transmitter/receiver ultrasonic sensors 42. For example, the transmitter-receiver pair of at least one sensor 42 may be offset axially along the pipe 22 such that the ultrasonic signal from the transmitter 44 has an axial component in its propagation direction, as shown in FIG. 4. The sensor 42 configuration shown in FIG. 5 includes sensors 42 configured in a pulse/echo configuration. In this embodiment, each sensing unit can include a single ultrasonic sensor 42 that acts as a transmitter 44 (TX) to transmit an ultrasonic signal through the pipe wall 32 and fluid substantially orthogonal to the direction of the fluid flow 23 and subsequently acts as a receiver 46 (RX) to receive a reflection of the ultrasonic signal reflected back from the wall 32 of the pipe 22 to the ultrasonic sensor 42. Alternatively, each sensing unit can include a receiver 46 that is independent of the transmitter 44. FIG. 6 illustrates sensor units arranged in a pitch and catch configuration. In this embodiment, the transmitter 44 and receiver 46 of each sensor unit are disposed axially along the pipe 22 on a same side of the pipe 22 at a predetermined distance apart. Each transmitter 44 provides an ultrasonic signal at a predetermined angle into the fluid flow 23. The ultrasonic signal propagates through the fluid flow 23 and reflects off of an inner surface of the pipe 22 and travels back through the fluid to the receiver 46 of that particular sensor 42. FIG. 7 illustrates another pitch and catch configuration for the sensors 42. This configuration is similar to that shown in FIG. 6 except that the sensors 42 disposed between the end sensors 42 function as both a transmitter 44 and a receiver 46. The sensor 42 configurations described above are examples of known sensor 42 configurations that can be used with a clamp on ultrasonic flow meter 24. The present invention damping device 26 can be used with any of these sensor 42 configurations and is not limited to use with these configurations.

Referring back to FIG. 3, the signals $S_1(t)$-$S_N(t)$ received from each ultrasonic sensor 42 are processed by an ultrasonic signal processor 48 and a signal processor 50 (having an array processor) for determining the velocity of the fluid flow 23 and/or volumetric flow rate. The signal processor 50 includes array processing logic, examples of which include SONAR processing logic and cross-correlation processing logic.

Figure 8:
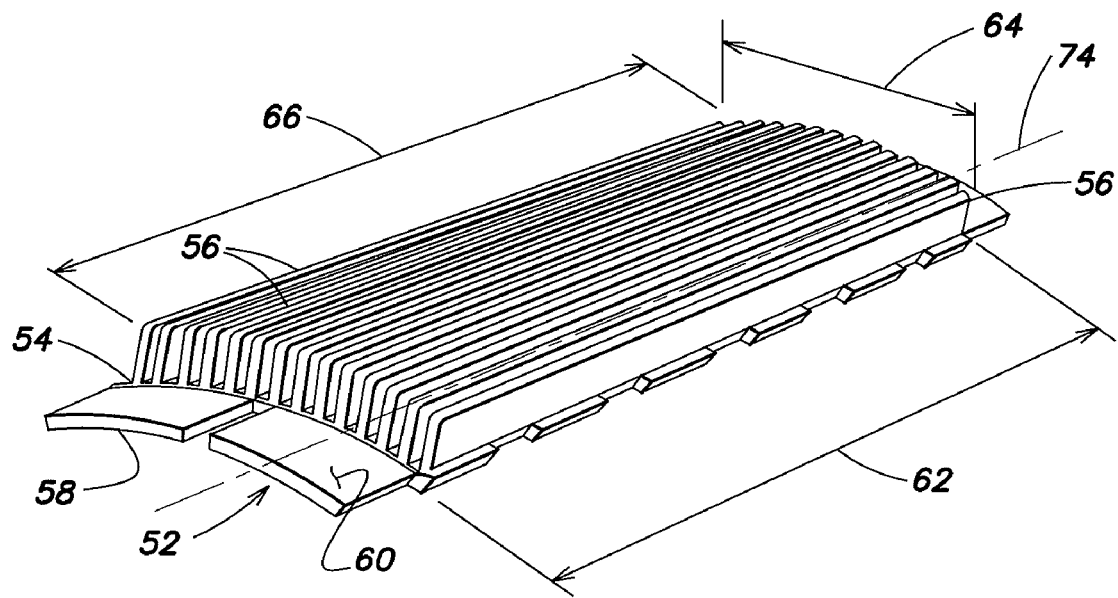
FIG. 8 is a perspective view of an embodiment of a damping panel.

The damping device 26 includes one or more damping panels 52 attachable to the exterior surface 38 of the pipe 22 (see FIGS. 1 and 2). In a first embodiment shown in FIG. 8, each damping panel 52 includes a base 54 and a plurality of tines 56. The base 54 has a pipe-side surface 58 and a tine-side surface 60. The plurality of tines 56 extends out from the tine-side surface 60 of the base 54. Each damping panel 52 preferably has a length 62 that extends a distance equal to or greater than the length of the ultrasonic sensor 42 array of the ultrasonic flow meter 24. In alternative embodiments, the damping panels 52 may have a shorter length and multiple damping panels 52 can collectively form what is shown in FIG. 8 as a single panel 52. Each damping panel 52 has a width 64. In the embodiment shown in FIGS. 1 and 2, the width 52 of each damping panel 52 is such that three damping panels 52 are disposed on each half of the pipe 22, between the sensor array transmitter 44 portion and the sensor 42 array receiver 46 portion. The damping device 26 is not limited to three panels 52 per side (six total), and may include, for example, one or more damping panels 52.

In the first embodiment, the base 54 of the damping panel 52 is either formed to mate with the curvature of the exterior surface 38 of the pipe 22, or is sufficiently flexible so as to be able to be conformed to the curvature of the pipe 22, or some combination thereof. The damping panel 52 conforms with the pipe 22 to create a uniform and intimate contact between the pipe-side surface 58 of the base 54 and the exterior surface 38 of the pipe 22, thereby facilitating wave energy transfer from the pipe wall 32 to the damping panel 52. The damping panel base 54 is also sufficiently flexible so that in response to wave energy transmitted to the base 54 at a position aligned with a tine 56, that portion of the base 54 and the aligned tine 56 can radially displace relative to contiguous portions of the damping panel 52 and thereby dissipate such wave energy.

Figure 9:
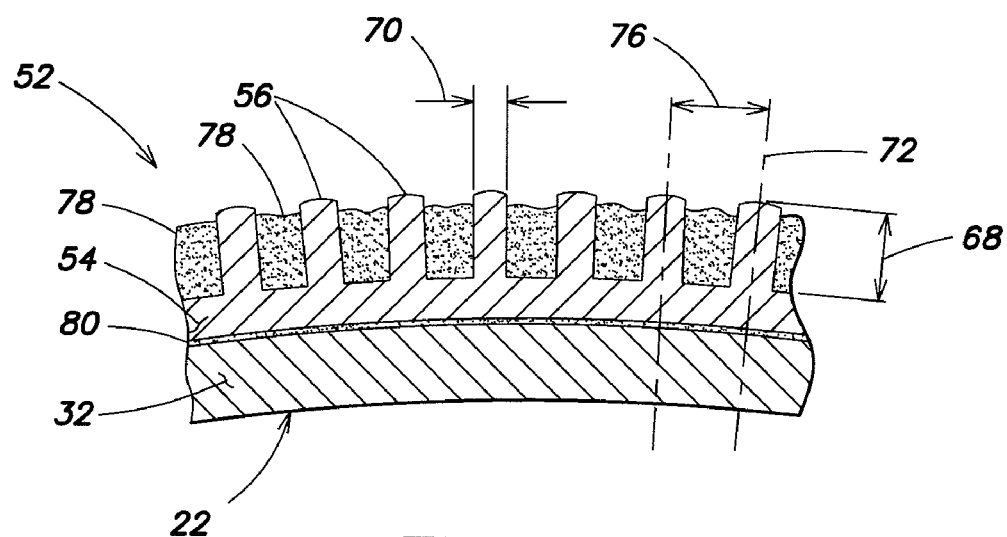
FIG. 9 is a diagrammatic sectioned partial view of a damping panel embodiment.

FIG. 9 shows an enlarged sectional view of a damping panel 52, illustrating a plurality of tines 56. Each tine 56 extends out from the base 54 and has a length 66, a height 68 and a width 70. Each tine 56 is preferably similar to or the same as the other tines 56. Each tine 56 has a heightwise extending centerline 72 and a lengthwise extending centerline 74 (see FIG. 8). When the damping panel 52 is attached to a pipe 22, the heightwise extending centerline 72 extends radially and the lengthwise extending centerline 74 extends axially. The length 66 of each tine 56 extends for substantially all of the length 62 of the damping panel 52. The tines 56 extend lengthwise along the panel 52 substantially parallel with one another and are spaced apart from one another by a predetermined tine-to-tine distance 76, extending between the centerlines 72 of adjacent tines 56. The tines 56 have a stiffness that facilitates the dissipation of energy transferred from wave energy introduced into the tine 56 as will be described below. The tines 56 are tuned to dissipate energy and to avoid resonant behavior that would amplify wave energy at the frequencies expected in the application at hand.

The tine-to-tine separation distance 76 is specifically chosen so that it less than a wavelength that is representative (e.g., average) of the wavelengths of one or more shear mode ring-around signals traveling within the wall of the pipe 22. The frequency of the shear mode ring-around signals, and therefore their wavelengths, are a function of the transmitter 44 excitation frequency. A more detailed description of the ring-around signals and their relationship to the transmitter 44 excitation frequency is provided below. In preferred applications, the tine-to-tine separation distance 76 is equal to or less than one-half the wavelength of the shear mode ring-around signal wave. For those applications where the tine-to-tine separation 76 is less than one half the ring-around wavelength, wavelengths that are factors of two less (e.g., one-quarter wavelength, one-eight wavelength, etc.) are preferred for alignment purposes as will be described below.

The damper panel 52 is made of a material that is operable to receive wave energy from the pipe 22. In preferred embodiments, the impedance of the damper panel material is approximately the same as that of the pipe wall 32 so as to minimize wave energy reflectance that may occur as a result of an impedance mismatch between the two materials. It is not necessary, however, to match damper panel 52 material impedance to that of the pipe wall 32 material.

Figure 10:
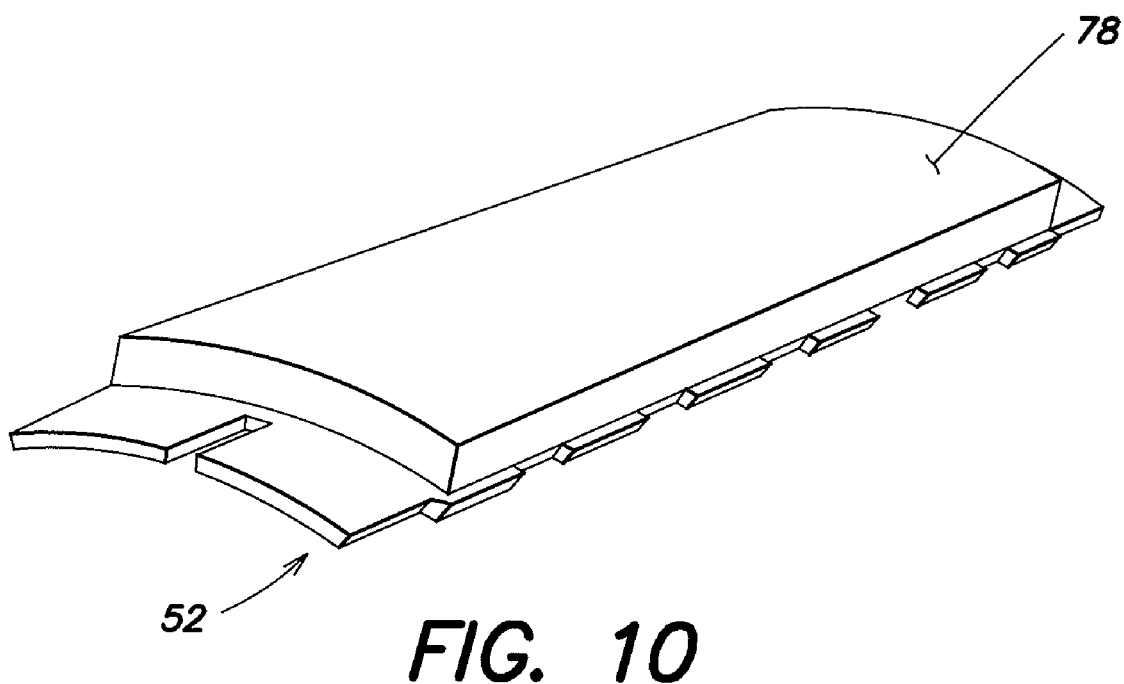
FIG. 10 is a perspective view of an embodiment of a damping panel.

In some embodiments, a viscoelastic material 78 is disposed between and bonded to, the tines 56 of the damper panel 52 (see FIG. 9). An example of an acceptable viscoelastic material 78 is Loctite® Hysol® 9460™ epoxy adhesive commercially offered by the Henkel Corporation. The present invention is not limited to any particular viscoelastic material and a variety of different materials may be used, with preferred materials varying depending upon the particular environment of the application. In some embodiments, the viscoelastic material 78 may also cover the tines, as is shown in FIG. 10.

Figure 11:
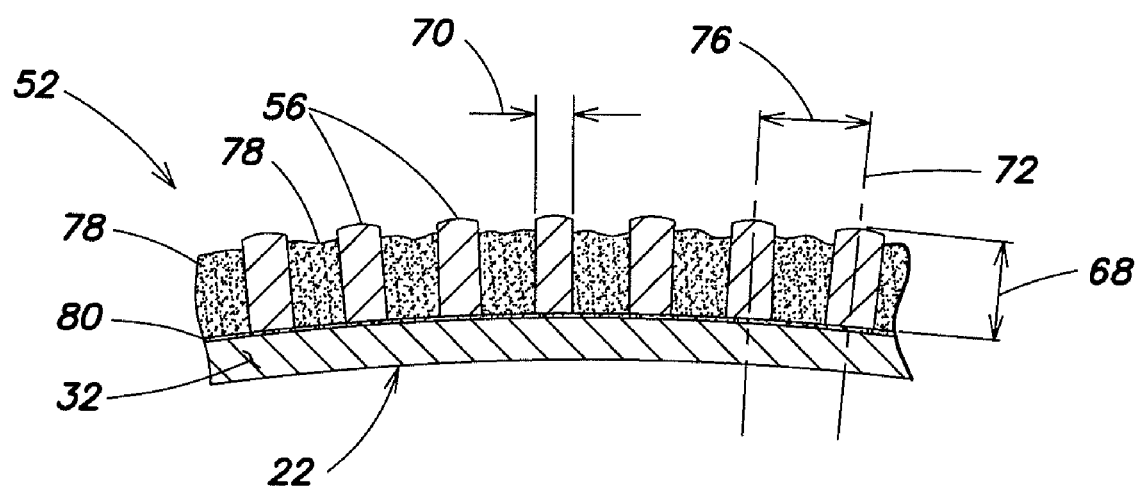
FIG. 11 is a diagrammatic sectioned partial view of a damping panel embodiment.

Now referring to FIG. 11, in another embodiment of the damping device 26, a laminate structure consisting of alternating layers of tine 56 and viscoelastic material 78 forms the damping panel 52. The tines 56 are the same as those described above in the damping panel 52 embodiment having a base 54, except that there is no base connecting the tines to one another. Like the above-described embodiment, the tines 56 extend substantially the length of the damping panel 52, substantially parallel to one another. In this embodiment, the end surfaces of the tines 56 form the pipe-side surface 58 of the damping panel 52. The viscoelastic material 78 is also the same as that described above, and is bonded to the surfaces of the tines 56.

The damping device 26 is attached to the exterior surface of the pipe wall 32. The present invention is not limited to any particular means (e.g., mechanical: straps, clamps, fasteners, etc.; chemical: epoxy, tapes, glues, etc.) for attaching the damping device 26 to the exterior surface of the pipe 22, and may include a couplant disposed between the damping device 26 and the pipe 22. In preferred embodiments, the pipe-side surface 58 of the damping device 26 is adhered and conformed to the exterior surface of the pipe 22 with a thin and uniform layer of an epoxy adhesive 80. Loctite® Hysol® 9460™ brand epoxy adhesive commercially offered by the Henkel Corporation can be used to bond the damping device 26.

Figure 12:
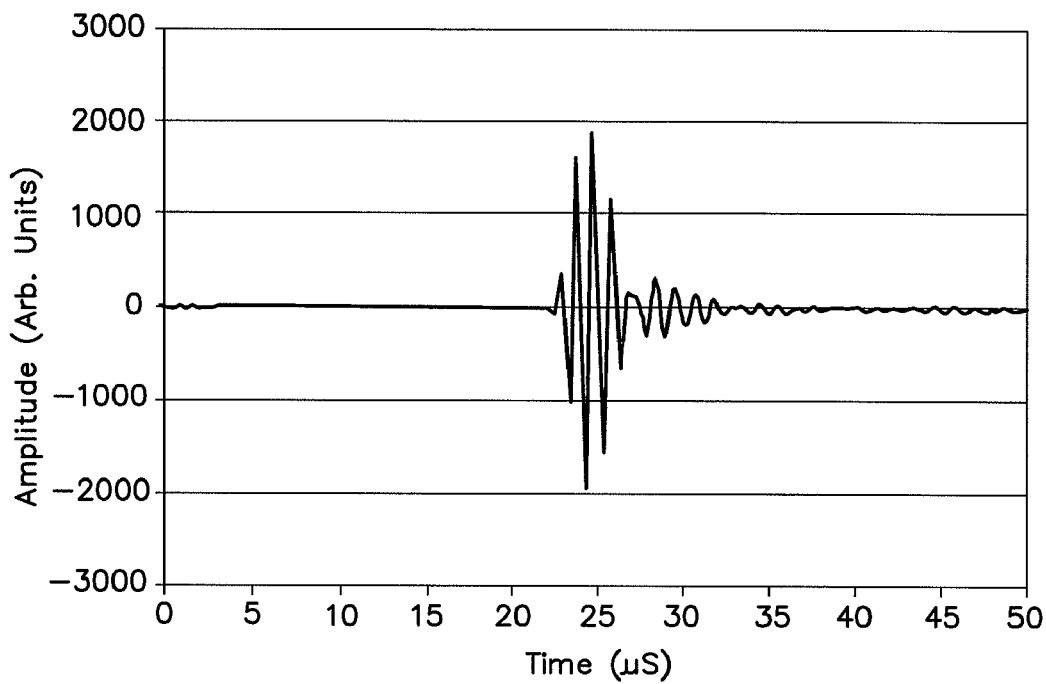
FIG. 12 is a graph of signal amplitude versus time of an ultrasonic signal without secondary signal noise.
Figure 14:
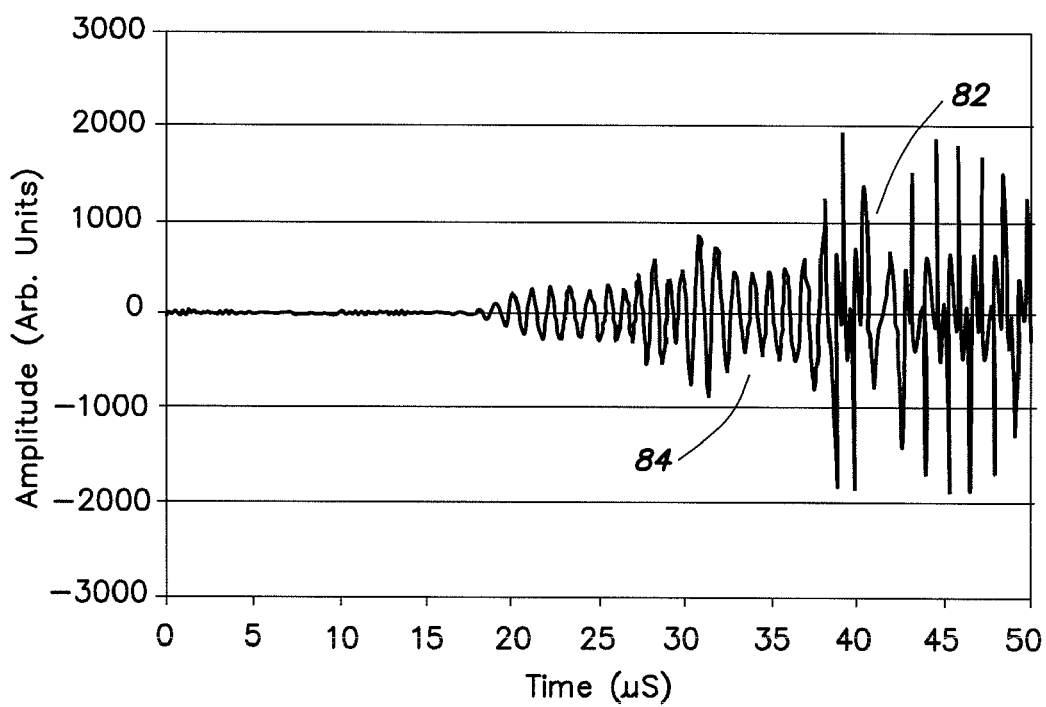
FIG. 14 is a graph of signal amplitude versus time of an ultrasonic signal with secondary signal noise.
Figure 13:
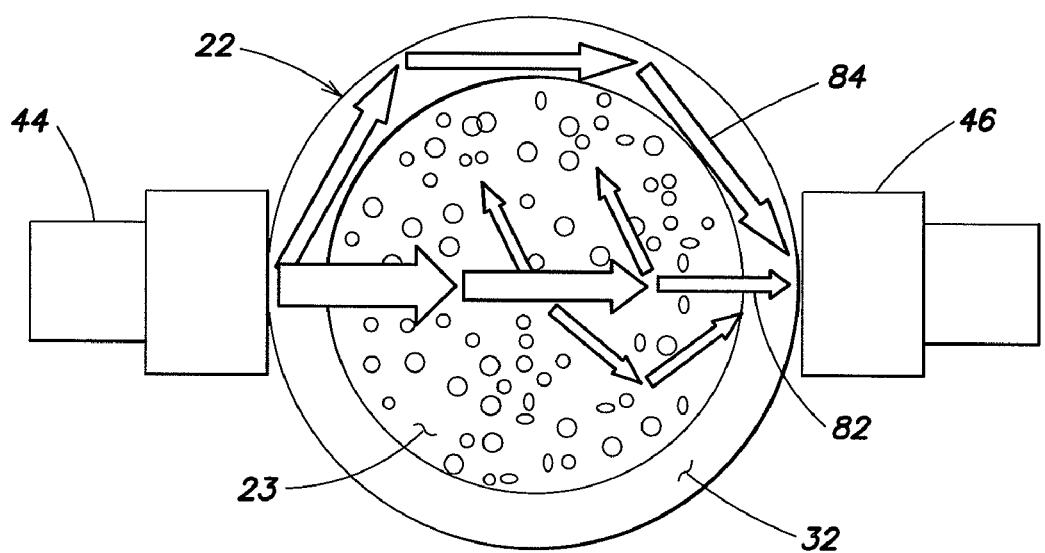
FIG. 13 is a diagrammatic view of an ultrasonic sensor mounting on a pipe illustrating fluid borne and structural signal paths.

In the operation of an ultrasonic flow meter 24 utilizing a present invention damping device 26, each transmitter 44 in the sensor 42 array is periodically pulsed to create the ultrasonic signal that transmits through the pipe 22 and fluid flow 23. Each transmitter 44 has a fundamental oscillation frequency, which when pulsed will emit a short ultrasonic burst signal at that frequency. FIG. 12 shows a signal created when an ultrasonic transmitter 44 having a fundamental oscillation frequency of 1 MHz is pulsed with a ten nanosecond (10 ns) width pulse. The receiver 46 associated with the transmitter 44 will receive the fluid borne component 82 of the signal once it has bisected the pipe 22. In addition to the fluid borne component 82, however, non-fluid borne component signals will also be received. Typically, the dominant non-fluid borne signals received are structural borne signals 84 that travel circumferentially within the pipe wall 32; i.e., "ring-around" signals 84. FIG. 13 shows a diagram of a transmitted ultrasonic signal having a fluid borne component 82 and a structural borne component 84 (i.e., a "ring-around" signal). The fluid borne component 82 travels between the orthogonally arranged transmitter 44 and receiver 46 pair of the ultrasonic sensor 42, in a direction that is normal to the direction of the fluid flow 23 within the pipe 22. At the same time, ring-around signals 84 are created that travel circumferentially within the pipe wall 32. In the absence of damping, the ring-around signal 84 will circumferentially within the pipe the receiver 46 in less time than the fluid borne component 82 with little attenuation, relatively speaking. In many instances, the ring-around signal 84 will travel from the transmitter 44 in both circumferential directions (i.e., clockwise and counterclockwise) and will circle the pipe 22 several times before fading out. Consequently, the ring-around signals 84 provide a considerable amount of the signal content received by the receivers 46, and make it very difficult to distinguish the desirable fluid borne component signals 82 from undesirable non-fluid borne signals 84. The problems associated with distinguishing the two signal components can be appreciated by comparing the signal shown in FIG. 14 (includes a ring-around component 84 and a fluid borne component 82) to the ultrasonic signal shown in FIG. 12 (only transmitted signal, no ring-around).

Figure 15:
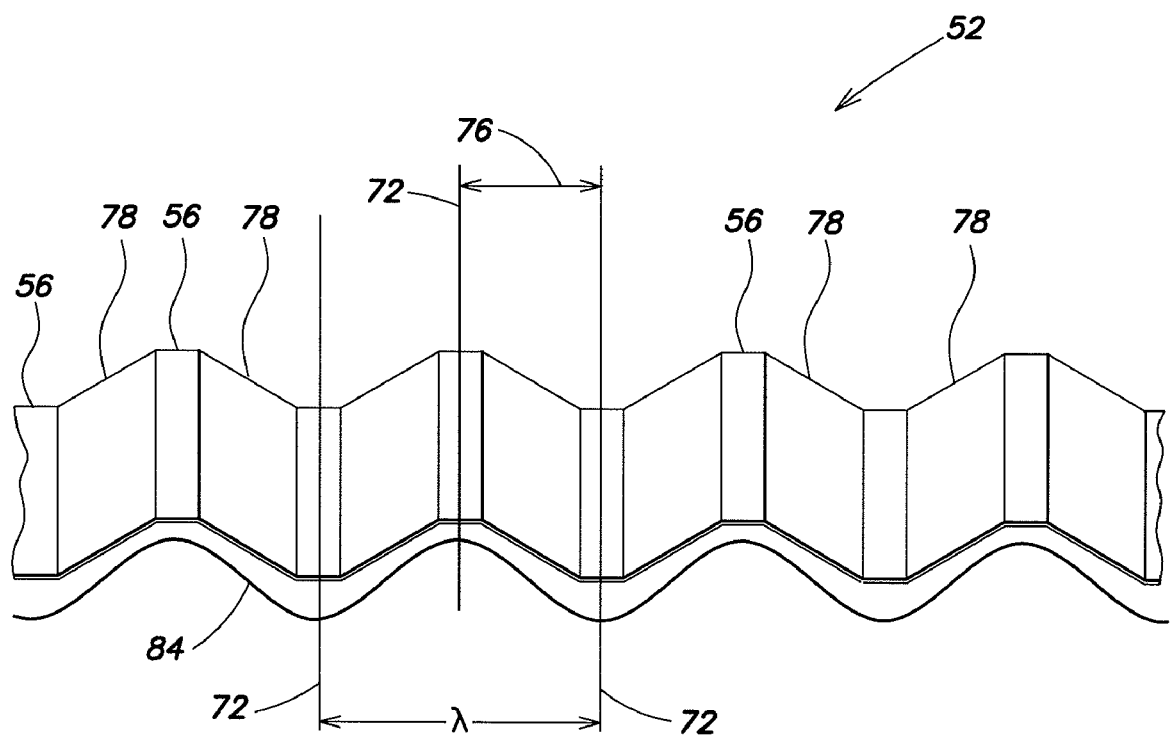
FIG. 15 is a diagrammatic view of a damping panel illustrating the relationship between tine-to-tine spacing and the wavelength of a secondary signal.

The present invention damping device 26 increases the system robustness of the ultrasonic flow meter 24 by damping the ring-around signal 84 circumferentially traveling within the pipe wall 32. By damping the ring-around signals 84, the damping device 26 decreases the amount of ring-around signal 84 that would otherwise be able to reach the sensor receivers 46. The ring-around signals 84 traveling within the pipe wall 32 as shear waves transmit energy into the damping panels 52. The damping panels 52, in turn, function as constrained layer dissipation mechanisms to dissipate the energy of the ring-around shear waves. One of the mechanisms by which the damping panels 52 dissipate energy is radial displacement of tines 56 that is caused by the ultrasonic shear wave. FIG. 15 shows an exaggerated diagram of tine displacement to illustrate the mechanism which actually occurs on a microscale. In the damping panel 52 embodiment having a base 54, the tine displacement is resisted by the base 54, and by the viscoelastic material 78 when included. The relative tine 56 motion and resistance thereto remove energy from and thereby damp the ring-around signals 84. The damping panel 52 embodiment formed as a laminate (i.e., layers of tine 56 and viscoelastic material 78) operates in similar fashion, except that the tine 56 motion is resisted by the viscoelastic material 78 alone.

The ability of the damping plates 52 to dissipate energy is greatly enhanced by correlation of the damping plate tines 56 to the wavelength of the shear wave 84 propagating through the pipe wall 32. The term "correlation" is used to mean that the separation distance between adjacent tines 56 (i.e., the tine-to-tine distance 76) within a damping plate 52 is chosen to coincide exacting or approximately with an aspect of the shear wave wavelength propagating within the pipe wall 32. The diagram shown in FIG. 15 illustrates a tine-to-tine separation 76 distance equal to one-half the wavelength of the shear wave. In this instance, the tines 56 are subject to the maximum and minimum amplitude of the wave, which is a condition that maximizes energy transfer to the damping panel 52. Tine-to-tine separation distances 76 less than one wavelength of the shear wave represent a correlation that provides enhanced damping, including optimum damping associated with one-half wavelength tine-to-tine separation, and wavelengths that are factors of the one-half wavelength (e.g., one-quarter wavelength, one-eight wavelength, etc.).

To illustrate the relationship between the wavelength of a circumferentially traveling ring-around wave 84 and the tine-to-tine separation distance 76, consider an example wherein a flow meter 24 has one or more ultrasonic transmitters 44, each with an oscillating frequency of 1 MHz. These transmitters 44 will produce compression waves traveling at 1 MHz through the pipe wall 32 in a direction normal to the pipe wall 32. The compression waves, in turn, will produce circumferentially traveling shear waves 84 within the pipe wall 32 traveling at a frequency of approximately 500 kHz, since shear waves travel at a speed approximately one-half that of the associated compression waves due to the difference between the bulk modulus and the shear modulus of the material. The sound velocity of waves within a material may be mathematically described as follows:

$$c_c = \sqrt{\frac{K}{\rho}} \text{ and } c_s = \sqrt{\frac{G}{\rho}}$$

where $c_c$ is the compression wave sound velocity, cs is the shear wave sound velocity, K is bulk modulus, G is the shear modulus, and $\rho$ is the density of the material.

If the pipe wall 32 is made of steel, the speed of sound of a shear wave in steel is approximately 2500 m/s. The associated wavelength of the shear wave within the steel pipe 22 is approximately 5 mm. A damping plate having a tine-to-tine separation of 2.5 mm will have a tine 56 aligned with the minimum and maximum amplitude positions of the shear wave traveling through the pipe wall 32, similar to that shown in FIG. 15. As a result, the energy transfer to the damping plate 52, and the ability of the damping plate 52 to function as a constrained layer dissipation mechanism is greatly enhanced.

As stated above, the tine-to-tine spacing 76 is not limited to one-half the wavelength of the shear wave traveling within the pipe wall 32. Other tine-to-tine spacing 76 based on a distance that is less than one wavelength of the shear wave will facilitate the ability of the damping device 26 to damp the undesired ring-around signals that are created when using a clamp-on ultrasonic flow meter 24.

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A damping device for a fluid flow meter mountable on the exterior of a pipe to meter fluid flow traveling within the pipe, which flow meter has at least one ultrasonic sensor operable to transmit ultrasonic signals through a pipe wall in a direction normal to the pipe wall and into a fluid flow disposed within the pipe, which signals create secondary ultrasonic signals circumferentially traveling within the pipe wall at a frequency, the device comprising:
   a base having a pipe-side surface, a tine-side surface, a width, and a length, which base is conformable to an exterior surface of the pipe wall in a manner such that the length of the base is substantially aligned with the fluid flow in the pipe;
   a plurality of tines attached to the base spaced apart from one another along the width of the base and extending outwardly from the tine-side surface and extending along the length of the base, wherein each tine is spaced apart from an adjacent tine by a tine-to-tine distance that is less than the wavelength of the secondary ultrasonic signals circumferentially propagating within the pipe wall.

2. The damping device of claim 1, wherein the tine-to-tine distance is equal to or less than approximately one half the wavelength of an average of the secondary signals.

3. The damping device of claim 1, wherein the tine-to-tine distance is equal to approximately one half the wavelength of an average of the secondary signals.

4. The damping device of claim 1, further comprising viscoelastic material disposed between and attached to the tines.

5. The damping device of claim 4, wherein the viscoelastic material covers all of the tines.

6. A damping device for a fluid flow meter mountable on the exterior of a pipe to meter fluid flow traveling within the pipe, which flow meter has at least one ultrasonic sensor operable to transmit ultrasonic signals through a pipe wall in a direction normal to the pipe wall and into a fluid flow disposed within the pipe, which signals create secondary ultrasonic signals circumferentially traveling within the pipe wall at a frequency, the device comprising:
   a laminate damping panel having a width, a length, and alternating layers of tines and viscoelastic material bonded to one another, wherein each tine is spaced apart from an adjacent tine along the width of the panel by a tine-to-tine distance that is less than the wavelength of the secondary ultrasonic signals circumferentially propagating within the pipe wall, and the tines extend substantially all of the length of the damping panel and substantially parallel with one another.

7. The damping device of claim 6, wherein the tine-to-tine distance is equal to or less than approximately one half the wavelength of an average of the secondary signals.

8. The damping device of claim 6, wherein the tine-to-tine distance is equal to approximately one half the wavelength of an average of the secondary signals.

9. A fluid flow meter apparatus operable to be attached to the exterior of a pipe and to meter fluid flow traveling within the pipe, the apparatus comprising:
   a metering device having a plurality of ultrasonic sensors operable to be mounted on an exterior surface of the pipe and to transmit ultrasonic signals orthogonally through a wall of the pipe and into the fluid flow traveling within the pipe, which signals create secondary ultrasonic signals circumferentially traveling within the pipe wall at a frequency; and
   at least one damping device operable to be attached to the exterior surface of the pipe, having a width, a length, and a plurality of tines, wherein each tine is spaced apart from an adjacent tine along the width of the device by a tine-to-tine distance that is less than the wavelength of the secondary ultrasonic signals circumferentially propagating within the pipe wall, and the tines extend substantially all of the length of the damping device and substantially parallel with one another.

10. The apparatus of claim 9, wherein the damping device includes a base conformable to the exterior surface of the pipe wall, the base having a pipe-side surface and a tine-side surface, and wherein the plurality of tines are attached to the base and extend outwardly from the tine-side surface.

11. The apparatus of claim 10, wherein the tine-to-tine distance is equal to or less than approximately one half the wavelength of an average of the secondary signals.

12. The apparatus of claim 10, wherein the tine-to-tine distance is equal to approximately one half the wavelength of an average of the secondary signals.

13. The apparatus of claim 10, further comprising viscoelastic material disposed between and attached to the tines.

14. The apparatus of claim 10, wherein the plurality of tines are disposed in a laminate structure having alternating layers of tines and viscoelastic material bonded to one another.

15. The apparatus of claim 14, wherein the tine-to-tine distance is equal to or less than approximately one half the wavelength of an average of the secondary signals.

16. The apparatus of claim 14, wherein the tine-to-tine distance is equal to approximately one half the wavelength of an average of the secondary signals.

* * * * *